United States Patent [19]

Clatfelter et al.

[11] Patent Number: 4,675,947

[45] Date of Patent: Jun. 30, 1987

[54] METHOD OF ELIMINATING AGING STEP IN POULTRY PROCESSING

[75] Inventors: Kenneth A. Clatfelter; Jerry E. Webb, both of Farmington, Ark.

[73] Assignee: Campbell Soup Company, Camden, N.J.

[21] Appl. No.: 883,688

[22] Filed: Jul. 9, 1986

[51] Int. Cl.⁴ .............................................. A22C 21/00
[52] U.S. Cl. .......................................... 17/47; 17/11; 17/51; 17/52; 426/523
[58] Field of Search ................... 17/45, 47, 51, 52, 11, 17/1 E, 11.1 R; 426/523

[56] References Cited

U.S. PATENT DOCUMENTS

| | | |
|---|---|---|
| 2,129,968 | 9/1938 | Sargent et al. |
| 2,210,376 | 8/1940 | Onorato et al. |
| 2,306,773 | 12/1942 | Biffinger |
| 2,544,681 | 3/1951 | Harsham et al. |
| 2,621,362 | 12/1952 | Cosden |
| 2,879,539 | 3/1959 | Cervin |
| 3,035,508 | 5/1962 | Nelson |
| 3,104,170 | 9/1963 | Mahon |
| 3,462,278 | 8/1969 | Mahon |
| 3,474,490 | 10/1969 | Groover et al. |
| 3,555,594 | 1/1971 | Groover et al. |
| 4,074,389 | 2/1978 | Blair |
| 4,517,207 | 5/1985 | Kress |

OTHER PUBLICATIONS

Abstract of the paper by Thompson et al, "Poultry Science Journal", 1986.

Primary Examiner—Willie G. Abercrombie
Attorney, Agent, or Firm—Banner, Birch, McKie and Beckett

[57] ABSTRACT

This invention relates to a method for processing poultry, including the conversion of live birds to component meat parts in substantially less time and using substantially less energy, which method comprises the steps of: providing a live poultry bird; slaughtering said bird without the application of electrical energy to stun or electrode said bird; scalding the carcass resulting from slaughter; subjecting said carcass to a conditioning step wherein said carcass is held in a warm, humid atmosphere and during which electrical stimulation is applied to said carcass for a period of time sufficient to render the poultry meat tender upon subsequent cooking without the need for an extended carcass ageing period; defeathering and eviscerating said carcass; cutting said carcass into component parts, if desired; and either immediately following said evisceration step, or said cutting step, introducing into said carcass or component parts a solution containing up to about 5 weight percent phosphate salts and up to about 2 weight percent sodium chloride.

12 Claims, No Drawings

METHOD OF ELIMINATING AGING STEP IN POULTRY PROCESSING

BACKGROUND OF THE INVENTION

1. Field of the Invention

This invention relates to the processing of poultry. Specifically, it relates to a method of preparing poultry exhibiting excellent tenderness characteristics wherein the conventional step of extended, low temperature aging of the defeathered and eviscerated poultry carcasses can be eliminated. More specifically, the invention relates to a method of processing poultry wherein the carcasses are maintained at substantially normal body temperature throughout the process and in which the carcasses, prior to defeathering and eviscerating, are subjected to a relatively short, high temperature conditioning step in a warm humid atmosphere, during which intermittent electrical stimulation is applied to the birds. In this process the subsequently eviscerated carcasses or cut-up parts are injected with a phosphate- and salt-containing solution to further improve tenderness.

2. Description of the Prior Art

Traditional methods of processing poultry typically begin by killing the poultry and bleeding it, usually by cutting the bird's jugular vein. Either before or during the killing, the bird is subjected to an electrical shock. The purpose of this shock is to stun (render semi-conscious) the poultry so that it does not struggle and jump about during the processing steps before rigor mortis sets in, thereby facilitating continuous automatic processing (e.g. on a shackle line). This struggling can cause broken wings and other bruises to the poultry, thereby reducing the value of poultry. The stunning can also make the removal of feathers easier.

After killing and bleeding, the carcass is usually scalded to make the removal of feathers easier. Next, the carcass is defeathered, and then eviscerated. Deterioration of the eviscerated carcass during the extended traditional processing scheme must be avoided, so its temperature at this point is reduced to about 40° F., typically by chilling the carcass in an ice or cold water bath. The chilled carcass is then aged at this low temperature for an extended period of time (e.g. on the order of about 4 to 12 hours) to provide the required degree of tenderness.

After low temperature aging, the carcasses are drained and can be prepared for distribution either raw or cooked, deboned or on the bone. Further, the carcass can also be cut into pieces before distribution or cooking. If the poultry is cooked, cooking time is extended by the time necessary to raise the temperature of the meat from about 40° F. to the cooking temperature. Finally, the parts or carcasses are packaged for distribution.

In an alternative processing scheme, the poultry is shocked after it is "stuck", i.e., after the jugular vein is cut. The purpose of the shock is to numb the bird so that it is not damaged by struggling. Such a scheme is described in U.S. Pat. No. 3,474,490. Stunning after slaughter also results in increased bleeding.

Both of the described processing schemes have proven to be unsatisfactory because of the long time between slaughter and shipment and the high energy consumption and capital costs associated with the process. The time required to obtain deboned raw flesh is typically up to 5½ hours. An additional up to 3½ hours is required for cooking and subsequent processing, including the time required to heat the poultry from the chilling temperature (approximately 40° F.). The capital costs for these systems can be substantial when commercial quantities of poultry are to be processed. The cost of aging facilities, chill tanks, ancillary equipment, and consumables such as ice, refrigeration, and the energy used to cool, reheat, and cook, must be considered. Even the methods of including agents intended to improve the organoleptic quality by tenderizing the meat and reducing weight loss due to moisture evaporation, as described in U.S. Pat. No. 3,104,170, have proven to be unsatisfactory in some respects.

The goal of shortening poultry processing time while producing an organoleptically pleasing product have been illusive. The method taught in U.S. Pat. No. 2,129,968 attempted to shorten processing time by simultaneously slitting the throat of the bird while shocking it through the knife. The shock is said to cause convulsive muscle contraction, thereby expelling the blood from the body instantly. This contraction is also said to empty the bird's stomach and crop. During both slaughtering periods when the birds are conveyed to the knife and from the knife to the defeathering operation, the poultry is conditioned in warm, approximately 120° F., high humidity air, in preparation for feather removal. This treatment is utilized in place of the traditional scalding step prior to the defeathering. However, a reasonable estimate of the amount of time saved by this process step is less than about 20 minutes. This saving is relatively insignificant, however, because the remainder of the traditional process, including chilling and lengthy aging, must be faithfully practiced.

It is an object of this invention to provide a method of poultry processing which greatly reduces the energy consumption and time required as compared to the conventional processes.

It is another object of this invention to provide a method of producing organoleptically superior poultry while eliminating the aging period.

It is a further object of this invention to provide a method for poultry processing which, by substantially shortening the time required for processing, obviates the need for refrigeration until after the poultry is cooked or is ready to be packaged for sale.

SUMMARY OF THE INVENTION

In accordance with these and other objectives, this invention relates to a method for processing poultry, including the conversion of live birds to component meat parts, in substantially less time and using substantially less energy, which method comprises the steps of: (a) providing a live poultry bird; (b) slaughtering said bird without the application of electrical energy to stun or electrocute said bird; (c) scalding the carcass resulting from step (b); (d) subjecting said carcass to a relatively short conditioning step wherein said carcass is held in a warm, humid atmosphere and during which intermittent electrical simulation is applied to said carcass for a period of time sufficient to render the poultry meat tender upon subsequent cooking without the need for an extended, low temperature carcass aging period; (e) defeathering and eviscerating said carcass; (f) cutting said carcass into component parts, if desired; and (g) immediately following either said evisceration step or said cutting step, introducing into said carcass or component parts a solution containing up to about 5 weight percent phosphate salts and up to about 2 weight percent sodium chloride.

DETAILED DESCRIPTION OF THE INVENTION

As used throughout the specification and claims, the word "poultry" means any fowl, whether domestic or hunted as game, such as, but not limited to, chicken, turkey, duck, goose, guinea hen, and the like. Further, "cooked" means any degree, including "partially done" and "ready-to-serve".

The present invention is based on the discovery that organoleptically superior poultry can be prepared even though the conventional low temperature aging step is eliminated. It has been discovered that poultry need not be shocked before or during slaughter. Instead, the poultry may be killed without being stunned and may be bled and conditioned before feather removal, during which conditioning the carcass can be electrically stimulated to induce rigor mortis. Compared to conventional techniques, the method of the invention not only shortens the processing time but also reduces energy consumption. Further, elimination of the chill tank reduces the risk of bacterial cross-contamination among carcasses. The method of this invention is especially effective where practiced on young birds. Not only is total processing time shortened, but also the resulting product is more tender.

Poultry to be processed by the method of this invention is first at least partially immobilized. In the preferred embodiment the poultry is hung in shackles, usually by the feet. This preparation step is well known in the art. The poultry is then slaughtered without being electrically shocked or stunned. Typically, the bird will be skilled by slitting its jugular vein. However, in the practice of the method of this invention, any method of killing the bird which does not introduce electricity into the carcass and which allows the blood to be quickly drained from the carcass is satisfactory. It has been discovered that for the purposes of the invention it is preferable not to have the bird stunned throughout the slaughter and bleeding so that muscular contractions can continue uninhibited throughout the bleeding.

As the carcass is bleeding, it is preferably transported on a shackle line to a conventional scalding operation. Scalding is an operation well known in the art. Its purpose is to prepare the carcass for the defeathering operation by relaxing the muscles which would otherwise make it difficult to remove the feathers. Typically, the carcasses are scalded in water at between about 125°–140° F., preferably between about 135°–138° F., for 60 to 90 seconds.

Immediately following the scalding operation, the carcasses are passed into a chamber which is maintained at a temperature approximately equal to the normal body temperature of the live bird, i.e., about 102° to 106° F. Preferably, the temperature in the chamber is maintained between about 90° to 110° F., and more preferably between about 102° to 106° F. To prevent drying of the carcass, which not only degrades the quality of the meat but also reduces the saleable quantity of meat because it reduces the moisture content of the meat, a high humidity atmosphere is established in the chamber. The relative humidity should preferably be at least 70 percent, more preferably 85 percent, and most preferably 100 percent. The particular method used to maintain this humidity level is not critical to the practice of this invention. Although introduction of steam into the chamber is preferred, any of the methods known in the art of humdification, such as hot water baths or mists or ultrasonic mists, are satisfactory.

The sequence of scalding, then conditioning, is not critical. The carcasses can be first conditioned, then scalded. However, the latter sequence makes subsequent defeathering more difficult and reduces the effectiveness of subsequent stimulation.

Additional protection against dehydration of the carcass is obtained by wetting the carcasses, especially if the time between scalding and entry into the conditioning chamber is lengthy, or if the relative humidity in the conditioning chambers is low. Additional surface water also helps ensure adequate electrical contact during stimulation and acts as a lubricant on the feathers, thereby easing movement on the shackle line.

The length of the conditioning step in the warm, humid chamber is dependent, inter alia, on the size, age, and physical condition of the bird. Large, old, or tough poultry will obviously require a longer conditioning period than will small, young, or tender birds. It has been discovered that conditioning periods of preferably between about 15 to 35 minutes are satisfactory for most commercially saleable chickens. One skilled in the art can determine the appropriate conditioning period for smaller birds such as cornish hens or larger birds such as turkeys.

It has been discovered that poultry can be made tender without a conventional aging period by electrically stimulating the carcass. This stimulation is advantageously done during the period of conditioning in the warm humidified chamber. The purpose of this stimulation is to induce contraction and relaxation of the muscle tissue. Practice of the method of this invention induces rigor mortis in the carcass within the conditioning period, thereby eliminating the need to age the carcass. Further, the ability to induce rigor mortis without having to lower the temperature of the carcass significantly reduces the cost of processing the poultry; neither refrigeration nor chill baths are needed and less energy is required to cook the warmer meat produced by the method of this invention.

In the practice of this invention, poultry carcasses are electrically stimulated for a period of between about 5 to 15 minutes. The entire carcass is stimulated at conditions sufficient to overcome the electrical resistance of the carcass and cause the muscles to contract. Either the voltage or the amperage can be adjusted, depending upon the number of chickens to be stimulated simultaneously. In one embodiment of the invention, a no-load voltage of 150 volts was applied between the legs and the necks of 7 chickens mounted in parallel. The current flow was approximately 1.4 amps at 125–130 volts.

The current is applied intermittently so that the muscles alternately contract and relax. The durations of the periods with and without current are variable and are preferably between about 0.5 to 7 seconds with current and between about 0.5 to 5 seconds without current. Most preferably, 2-second periods of stimulation are alternated with 1- or 2-second periods without stimulation. The most preferred periods allow the muscles to contract fully and then relax completely to maximize the efficiency of the operation and completely tenderize the meat.

The apparatus used to apply current to the birds are well-known to those skilled in the art, and any of the commonly-used forms may be employed. In general, the equipment required to apply the electrical stimulation must be capable of adjustment to vary both the period of current application and the period between current applications. Further, the equipment should ensure good contact with the poultry to ensure current flow.

The poultry can be treated individually or in parallel. Current can be passed through essentially the entire carcass by ensuring that the current is passed, for example, from the feet or legs to the neck or breasts.

When a pair of contact points, e.g., breasts, legs, or feet, is utilized, the equipment should ensure contact with both members of the pair. It has been discovered that if only one of a pair of contact points is utilized, the current "short-circuits" through only that side. Thus, portions of the carcass are not fully stimulated. These portions are organoleptically less satisfying than the properly stimulated portions.

The feet can be held in shackles or attached to a bar or other implement. The preferred apparatus for applying the electrical stimulation comprises a spring-biased metal rod which contacts both feet or legs while at least a second rod contacts the neck or both breasts. Adequate contact with this second rod is ensured by locating it so that the suspended carcass must touch it. The voltage different between the rods causes current to flow when the poultry is contacted. A difference or between about 10 to 200 volts preferably is maintained during the stimulation treatment. Similarly, the bird can be attached to a conductive bar with conductive wire. The contact may be made by a wire or wires which touch the poultry. Alternatively, the contacts can be probes which are inserted into the poultry. Any of these methods can be utilized in the practice of this invention.

Both bars and rods can be one-piece or segmented contruction and can be horizontally and vertically adjustable to ensure adequate contact. Precise construction details are not critical to the invention. However, it has been discovered that spring biasing of the feet-contacting rods reduces the likelihood of damage to the shackle at the point where the chickens begin and end contact with the rod.

At the completion of the conditioning step, during which rigor mortis is induced, the carcasses are removed from the conditioning chamber and are defeathered and eviscerated. Preferably, the carcasses are continuously transported from the scalder to the conditioning chamber on the shackle line, thereby ensuring that the carcasses are both scalded in proper sequence and conditioned uniformly. The procedures used to accomplish the defeathering and evisceration are not critical to the method of this invention. Therefore, any of the techniques well known in the art are acceptable.

Immediately following evisceration, the carcasses are injected with a solution which comprises phosphate salts and sodium chloride. Although the purpose and use of this phosphate- and salt-containing solution are well known in the art, it has been discovered that the temperature of the injected solution can be adjusted to save both time and energy during cooking or cooling of the meat. Any solution temperature can be utilized, but those skilled in the art will recognize that microbial growth in the solution is undesirable. Various methods of controlling microbial known in the art are suitable for use in the method of this invention. Microbial growth occurs at temperatures between about 50° to 170° F. especially in the presence of proteinaceous materials. Proteinaceous materials would typically be introduced to the solution when solution which is not retained in the meat after injection is recycled. Therefore, if the solution is not recycled, the temperature of the solution to be injected is not critical. Alternatively, unretained solution can be recycled if certain precautions are taken. For example, if solution temperature is kept either low, preferably less than about 50° F., and more preferably less than about 40° F., or high, preferably greater than about 170° F. and more preferably between about 180° to 200° F., microbe growth is not significant. The solution could also be sterilized, or subjected to ultra-filtration to remove the proteinaceous materials. Any of these and other known methods of controlling microbe growth are suitable.

The preferred solution temperature depends in part upon the subsequent treatment of the carcass and the amount of solution to be retained in the meat. Relatively cool solutions can be advantageously utilized if the meat is to be chilled without cooking while relatively hot solutions can be advantageously used if the meat is to be cooked immediately. However, it has been discovered that solution retention by the meat is maximized if the solution temperature is between about 90° F. to 150° F. At solution temperatures above about 150° F., the meat surrounding the area of the hot solution will begin to cook. Although the inventors do not wish to be bound by this theory, it is believed that this cooking prevents maximum absorption of the fluid by the meat. Therefore, if maximum fluid retention is desired, solution temperature should be between about 90° F. to 150° F.

The quantity of solution which can be retained in the meat is dependent in part upon the phosphate and salt concentrations of the solution. These solutes will be deposited in the carcass with the retained solution, so the level of phosphate and salt in the meat will increase as the amount of solution retained and the concentrations of the solutes increase. Therefore, the quantity of the solution which can be injected is limited by either the concentrations of phosphate and salt in the solution, or the amount of solution the meat can retain.

The quantity of salt which can be deposited into the carcass is limited only by organoleptic considerations. To avoid the possibility that the product will become too salty, the salt concentration in the solution should be limited to about 2 weight percent, preferably less than about 1 weight percent, and more preferably between about 0.6 to 0.8 weight percent. Either iodized or noniodized salt may be utilized.

The quantity of phosphate in the meat as sold is strictly limited by the United States Department of Agriculture to less than 0.5 weight percent. Therefore, the phosphate concentration in the solution should be limited to less than about 5 weight percent, preferably between about 2 to 5 weight percent. The quantity of solution which can be deposited is up to about 30 weight percent of the mass of the injected part, and preferably is between about 5 to 30 weight percent.

Most commonly-known phosphate salts may be used in the practice of this invention. Examples include noncyclic polyphosphates of alkali metals such as sodium or potassium, and in particular sodium phosphate. Other acceptable phosphate salts include sodium polyphosphate, sodium tripolyphosphate, sodium hexametaphosphate, tetrasodium pyrophosphate, sodium acid pyrophosphate, potassium tripolyphosphate, and tetrapotassium pyrophosphate.

If the poultry is to be packaged raw, the lower temperature solution is utilized to facilitate cooling or freezing. Although cool solution can be used if the poultry is to be cooked immediately, the preferred embodiment is to use warm solution to raise the meat temperature in preparation for cooking.

The cooking may be done in any manner known in the art. For example, poultry can be cooked whole or in parts, and can be either uncoated or coated with batter, breading, and the like. Further, it can be fried, roasted, or steamed, or a combination of these methods can be used. The number of parts into which the carcass is cut is not critical to the practice of this invention. The time required to cook each part will be dependent upon not only the size but also the identity (e.g., breast, wing, drumstick, thigh) of the part. Skilled artisans can adjust the cooking time. In the practice of this invention, however, the time required to cook the poultry clearly will be shorter than the time required to cook chilled poultry. The expected temperature of the fowl prepared in the practice of the preferred embodiment of this invention between about 80° to 115° F. before cooking, whereas the temperature of the conventionally prepared poultry would be about 40° F.

In another alternative embodiment of this invention, the poultry can be cut up into discrete pieces before the phosphate- and salt-containing solution is injected. Thereafter, the processing proceeds in the manner described above.

The total time saving in the method of this invention is dependent upon the temperature of the solution if the poultry is to be cooked. However, the preferred embodiment can produce fully cooked poultry in about 3 hours less than the minimum time required utilizing conventional techniques. Slightly less time is saved if the poultry is not cooked because the cooking time saving is not realized.

Tenderness of the meat is measured in an Instron Model 1000 shear press. Cooked meat is trimmed to remove all fat, bone, burnt areas, gristle, and other deleterious material. The meat is hand-cut into approximately ⅜ inch cubes. The cubes are mixed, then weighed into 20-gram portions. Multiple portions from the same muscle are utilized for confirmatory tests.

The diced meat is spread evenly over the interior bottom surface of a metal cube approximately 2½ inches on each side. The sides and bottom of the cube are slotted, and a slotted top covers the cube. The cube is placed inside the Instron shear press, wherein a plurality of blades enters the slots in the cube and cube cover. As the blades are forced through the meat, the shear press measures and records the pounds of force required to cut through the meat. In this invention the preferred shear value is less than about 280, and more preferably less than about 240.

Although the above-described preferred embodiments of this invention involve continuous processing, the method of this invention may be practiced batchwise. Therefore, the invention is not limited to continuous processing, but embraces batchwise processing as well.

The invention is further illustrated in the following examples.

EXAMPLE 1

Thirty chickens, each weighing about six pounds, were slaughtered without stunning by slitting the throats manually. They were then scalded in water at 136° F. for approximately 60 to 70 seconds. The carcasses were then continuously passed into a conditioning chamber and sprayed with water at about 105° F. The chamber temperature was maintained at between about 105° to 108° F. by injecting steam. The relative humidity was about 70 percent.

The carcasses were continuously transported on a shackle line through the conditioning chamber in 24 minutes. As the carcasses were moved through the conditioning chamber, the legs of the carcasses were passed between spring-biased rods which were adjusted horizontally and vertically to give optimum contact between the bars and the carcasses. A second bar was adjusted to ensure adequate contact with the breast, near the neck, of each carcass. The carcasses were stimulated with 125 volts for 5 minutes, with current applied for 1.3 seconds and 1.3 seconds between applications.

After conditioning and stimulation, the carcass were defeathered in a feather-picking machine. The carcasses then were eviscerated and the breasts were injected with an aqueous solution containing 2.5 percent phosphate and 0.7 percent salt. The temperature of the solution was 100°–110° F. The breasts were then split to form left and right halves and fried for 3 minutes at 360° F., then cooked in an oven for 14 minutes at 360° F. (wet bulb temperature was 180° F.).

The total elapsed time, from the time the first chicken was killed until all meat was completely cooked, was 95 minutes. The average shear value, determined by utilizing the Instron machine in the above-described procedure, was approximately 245, with 86 percent of the values less than 280, and 47 percent less than 240.

EXAMPLE 2

Seventeen chickens having an average live weight of 5.6 pounds each were manually slaughtered without stunning by slitting the throats. They were allowed to bleed, were scalded at 134° F. for between about 60–70 seconds, and then were held in a conditioning chamber for 23 minutes. The temperature in the chamber was maintained between about 105°–108° F. by injecting steam. The relative humidity was therefore about 70 percent.

The carcasses were continuously transported on a shackle line through the conditioning chamber. As the carcasses were moved through the conditioning chamber, the legs of the carcasses were passed between spring-biased rods. These rods ensure good electrical contact while allowing movement of the chickens to avoid entanglement of the shackles, especially where contact between the bar and the carcasses is made and broken. During the 23-minute conditioning, the chickens were stimulated for 5 minutes at 125 volts, with current applied for 0.7 seconds and 0.7 seconds between applications.

The chickens were defeathered immediately after they emerged from the conditioning chamber, then were eviscerated. The breasts were injected with an aqueous solution containing 2.5 weight percent phosphate and 0.7 weight percent salt. The temperature of the injected solution was about 105° F. Each breast half was battered and cooked. First the meat was fried for about 3 minutes at 360° F. and then was cooked in a multi-purpose oven for 12.5 minutes at 360° F. dry bulb temperature (180° F. wet bulb temperature).

The total elapsed time from the killing of the first chicken until all of the meat was completely cooked was less than 90 minutes. The average shear value, determined by utilizing the Instron machine in the above-described procedure, was approximately 242, with 84 percent of the values less than 280 and 54 percent less than 240.

EXAMPLE 3

A number of chickens, ranging in weight from 3.5 to 7.1 pounds and having an average live weight of 5.6 pounds, were slaughtered without stunning. The slaughter was by manual throat slitting. The carcasses were scalded in water at 135° F. for about 60 to 70 seconds, then were continuously passed into the conditioning tank chamber and sprayed with water at a temperature of about 105° F. The temperature within the chamber was maintained at between 105°–108° F. by injected steam. The relative humidity was about 70 percent. The carcasses were continuously transported on a shackle line through the chamber in about 28 minutes. The chickens were stimulated for 5 minutes with 0.7 seconds of current applications and 0.7 seconds between applications.

After conditioning and stimulation, the carcasses were immediately defeathered in a feather picking machine. The carcasses were then eviscerated and the breast were injected with the aqueous solution containing 2.5 percent phosphate and 0.7 percent salt. The temperature of the solution was approximately 105° F. The breasts were then split to form left and right halves, battered, and fried for 3 minutes at 360° F., then cooked in an oven for 14 minutes at 360° F. (180° F. wet bulb).

The chickens slaughtered by this method took 48 minutes from time of slaughter to the start of frying, and less than 1½ hours from the time the slaughter began until the last carcass was cooked. The average Instron shear value was 254, with 42 percent less than 240 and 78 percent less and 280.

EXAMPLE 4

The method of Example 1 is essentially followed with the exception that solution is injected into the entirety of the carcass, which is subsequently cooked. The resulting cooked chicken is organoleptically pleasing and tender.

EXAMPLE 5

Chickens are hung on shackles continuously moving at up to about 150 chickens per minute. The chickens are not stunned, but are slaughtered either mechanically or manually and allowed to bleed for approximately 90 seconds. The chickens are scalded in water at 125° to 140° F. for up to about 90 seconds. The chickens are continuously transported on the shackle line into a chamber where they are held for 15 to 35 minutes. They are intermittently electrically stimulated using a source to produce voltage from 50 to 200 volts. The periods of application of electrical stimulation are 2 seconds, with either 1- or 2-second periods between stimulations. The total period of stimulation varies from 5 to 15 minutes. The chamber temperature is between about 102° to 106° F. and the relative humidity is at least 70 percent.

The chickens are continuously transported to the pickers where they are defeathered. The carcasses continue on the line, the feet are removed, and the carcasses are rehung on the eviscerating shackle line. The carcasses are eviscerated and immediately injected with a phosphate and salt solution comprising 2.5 weight percent phosphate and 0.7 weight percent salt. The cooked meat is found to have acceptable flavor and tenderness.

EXAMPLE 6

To illustrate the effect of processing sequence, a number of chickens were conditioned and stimulated, then scalded and defeathered. Each chicken was slaughtered without stunning by manually slitting its throat. The conditioning chamber was maintained at about 100° F. and 75 percent relative humidity. The carcasses were sprayed with water at about 100° F. The carcasses were conditioned for 24 minutes, and were stimulated for 5 minutes at about 125 volts. Current was applied for 0.7 seconds, with 0.7 seconds between applications.

The carcasses then were scalded in approximately 135° F. water for between about 60–70 seconds. The breasts were injected with an aqueous solution containing 2.5 weight percent phosphate and 0.7 weight percent salt. the solution temperature was about 100° F. The breasts were then removed from the carcasses and quartered. The quarters were fried for 3 minutes at 360° F., and then were cooked at 360° F. (180° F. wet bulb) for about 12 minutes.

Shear values were determined by utilizing the Instron machine in the above-described manner. Average shear value for the group was 220, with 65 percent less than 240 and 82 percent less than 280.

EXAMPLE 7

A number of chickens were slaughtered without stunning by slitting the throats manually. They then were scalded in water at about 135° F. for between about 60-70 seconds. The carcasses then were continuously passed into a conditioning chamber and sprayed with water at about 100° F. The chamber temperature was maintained at about 100° F. by injecting steam. The relative humidity was about 75 percent.

During the 24-minute conditioning period, carcasses were stimulated for 5 minutes at about 125 volts. Current was applied for 0.7 seconds with 0.7 seconds between applications. After conditioning and stimulation, the carcasses were defeathered in a feather picking machine. The carcasses were then eviscerated and the breasts were injected with an aqueous solution containing 2.5 weight phosphate and 0.7 weight salt. The temperature of the solution was about 100° F. The breast were then removed from the carcasses and quartered. The quarters were fried for 3 minutes at 360° F. and then were cooked at 360° F..(180° F. wet bulb) for about 12 minutes.

Shear values were determined by utilizing the Instron machine in the above described manner. Average shear value for the group was 126 with 100 percent less than 220.

EXAMPLE 8

Chickens were suspended from shackles and continuously processed through a stunner. The stunner, a device known in the art, passes a current of less than about 0.5 A at 50–100 volts through the chicken.

The stunned chickens were slaughtered by slitting their throats, bled, and scalded in water at about 138° F. for between about 60 to 70 seconds. The carcasses then were then defeathered and eviscerated in the standard manner, and were immersed in ice water at about 32° F. immediately thereafter.

After 4 hours of chilled aging, the carcasses were removed from the ice bath, the breasts were removed and cooked in boiling water for about 20 minutes. The cooked meat was diced into ⅜-inch cubes which yielded an average shear value, as measured with the Instron shear press, of 276.

EXAMPLE 9

The method of Example 8 was substantially followed in a number of trials. The average shear value was approximately 295, with about 35 percent of the values less than 240 and 53 percent less than 280.

EXAMPLE 10

The method of this invention was compared to traditional chilled-aging methods. A group (Group I) of chickens was prepared by the method of this invention, as described in Example 7. A second group (Group II) was prepared in accordance with the traditional method of Example 8. Part of this group (Group II-4) was chilled for 4 hours; the remainder was chilled for 24 hours (Group II-24). The following Instron values were obtained on cooked breast meat:

|  | GROUPS | | |
| --- | --- | --- | --- |
|  | I | II-4 | II-24 |
| Average Instron value | 144 | 240 | 230 |
| Percent less than 240 | 100 | 72 | 89 |
| Percent less than 280 | 100 | 83 | 98 |

These values illustrate that the method of the invention produces fowl which is more tender than fowl produced by traditional methods.

Although preferred embodiments of this invention have been discussed herein, those skilled in the art will appreciate that changes and modifications may be made without departing from the spirit of this invention, as defined in and limited only by the scope of the appended claims.

We claim:

1. A method for processing poultry including the conversion of live birds to component meat parts in substantially less time and using substantially less energy, which method comprises the steps of:
   (a) providing a live poultry bird;
   (b) slaughtering said bird without the application of electrical energy to stun or electrocute said bird;
   (c) scalding the carcass resulting from step (b);
   (d) subjecting said carcass to a conditioning step wherein said carcass is held in a warm humid atmosphere and during which electrical stimulation is intermittently applied to said carcass for a period of time sufficient to render the poultry meat tender upon subsequent cooking without the need for an extended, low temperature carcass aging period;
   (e) defeathering and eviscerating said carcass;
   (f) cutting said carcass into component parts, if desired; and
   (g) immediately following either said evisceration step or said cutting step, introducing into said carcass or component parts a solution comprising up to about 5 weight percent phosphate salts and up to about 2 weight percent sodium chloride.

2. The method of claim 1 wherein the temperature of said atmosphere during said conditioning step is between about 90° to 110° F. and the relative humidity is at least about 70 percent.

3. The method of claim 1 wherein the duration of said conditioning step is between about 15 to 35 minutes.

4. The method of claim 1 wherein the total time of said electrical stimulation treatment is between about 5 to 15 minutes.

5. The method of claim 1 wherein said carcass or component from step (g) is cooked immediately following said introduction of solution.

6. The method of claim 1 wherein said intermittent application of current is for a duration of about 0.5 to 7 seconds with non-current intervals of from about 0.5 to 5 seconds.

7. The method of claim 1 wherein said solution is introduced into said carcass or component parts at a temperature of less than about 50° F.

8. The method of claim 1 wherein said solution is introduced into said carcass or component parts at a temperature of between about 90°-150° F.

9. The method of claim 1 wherein the quantity of said solution introduced into said carcass or component parts is between about 5 to 30 weight percent of the poultry injected.

10. The method of claim 1 wherein the phosphate concentration of said solution is between about 2 to 5 weight percent and the sodium chloride concentration of said solution is between about 0.6 to 0.8 weight percent.

11. A method for processing poultry including the conversion of live birds to component meat parts in substantially less time and using substantially less energy, which method comprises the steps of;
   (a) providing a live poultry bird;
   (b) slaughtering said bird without the application of electrical energy to stun or electrocute said bird;
   (c) scalding the carcass resulting from step (b);
   (d) subjecting said carcass to a conditioning step wherein the temperature is between about 90° to 110° F. and the relative humidity is at least about 70 percent for a period of between about 15 to 35 minutes;
   (e) electrically stimulating said carcass for between about 5 to 15 minutes during said conditioning step, said electrical stimulation comprising alternating 2-second periods during which current is applied with periods of between about 1-2 seconds without current;
   (f) defeathering and eviscerating said carcass;
   (g) cutting said carcass into component parts, if desired; and
   (h) immediately following either said evisceration step or said cutting step, introducing into said carcass or component parts a quantity of solution of between about 5 to 30 weight percent of the poultry injected, said solution having a temperature of between about 90° to 150° F. and comprising about 2 to 5 weight percent phosphate salt and between about 0.6 to 0.8 weight percent sodium chloride.

12. The method of claim 11 wherein said carcass or component part from step (h) is cooked immediately after said introduction of solution.

* * * * *